United States Patent
Bryant et al.

(10) Patent No.: US 8,721,755 B2
(45) Date of Patent: *May 13, 2014

(54) FOG AND MIST CATCHING APPARATUS

(75) Inventors: Paul Sherwood Bryant, Amesbury (GB); Alan Edwin Baigent, Petersfield (GB); Paul Christopher James Bissett, Alton (GB); John Carl Davies, Portsmouth (GB); Evdokia Ivanovna Huddlestone, Winchester (GB); Etienne Rene Jarrier, Reading (GB); Ian Hugh Sutherland, Farnborough (GB)

(73) Assignee: BHA Altair, LLC, Franklin, TN (US)

( * ) Notice: Subject to any disclaimer, the term of this patent is extended or adjusted under 35 U.S.C. 154(b) by 984 days.

This patent is subject to a terminal disclaimer.

(21) Appl. No.: 12/829,624

(22) Filed: Jul. 2, 2010

(65) Prior Publication Data

US 2012/0000176 A1      Jan. 5, 2012

(51) Int. Cl.
*B01D 59/50* (2006.01)

(52) U.S. Cl.
USPC ............... 55/486; 55/423; 55/445; 55/490; 60/39.091; 60/39.092; 60/39.093

(58) Field of Classification Search
USPC ............ 60/39.092, 39.093; 415/121.2, 169.1; 244/53 B; 55/306, 423, 442, 445, 462, 55/486, 487, 490, 511
See application file for complete search history.

(56) References Cited

U.S. PATENT DOCUMENTS

| | | | |
|---|---|---|---|
| 4,300,918 A | 11/1981 | Cary | |
| 5,191,767 A | 3/1993 | Kane et al. | |
| 5,620,503 A | 4/1997 | Miller et al. | |
| 7,404,837 B2 | 7/2008 | Killion et al. | |
| 2007/0294988 A1 | 12/2007 | Miller et al. | |
| 2009/0031682 A1 | 2/2009 | Langlands et al. | |
| 2009/0044702 A1 | 2/2009 | Adamek et al. | |

FOREIGN PATENT DOCUMENTS

| | | | |
|---|---|---|---|
| JP | 2000257445 A | * | 9/2000 |
| WO | 87/01959 A1 | | 4/1987 |

* cited by examiner

*Primary Examiner* — Craig Kim
(74) *Attorney, Agent, or Firm* — Reinhart Boerner Van Deuren P.C.

(57) ABSTRACT

An apparatus is provided and includes an inlet, including a peripheral wall formed to define a pathway along which gaseous, fluidic and particulate matter flow and two or more nets sequentially disposed in the pathway, the two or more nets being suspended on the peripheral wall with substantially no clearance between each of the two or more nets and the peripheral wall and held sufficiently loosely to permit relative movement of each of the two or more nets such that an effective pore size of the two or more nets is variable over time to encourage fluidic condensation at the two or more nets and to permit a relatively substantial portion of the gaseous and particulate matter to continue to flow.

27 Claims, 3 Drawing Sheets

FOG AND MIST CATCHING APPARATUS

BACKGROUND OF THE INVENTION

The subject matter disclosed herein relates to a fog and mist catching apparatus.

Generally, gas turbine filtration enclosures and systems that are situated in relatively dry, dusty regions, such as the Middle East, are challenged by a combination of relatively high dust, particulate and contaminant loads along with local environmental conditions that can include heavy fog periods. The combination of these can prove challenging for final, high efficiency filters even with pulse cleaning systems installed. This is because the combination of conditions can create a "mud" like cake on the filters that shortens their operational life.

The traditional and existing approach to solving this issue is to use coalescing pads or filters upstream of the final filters as a low cost, cleanable protection device for the more expensive final filters. These coalescing pads can, however, be maintenance intensive with change out periods as frequently as every week to two weeks.

BRIEF DESCRIPTION OF THE INVENTION

According to one aspect of the invention, an apparatus is provided and includes an inlet, including a peripheral wall formed to define a pathway along which gaseous, fluidic and particulate matter flow and two or more nets sequentially disposed in the pathway, the two or more nets being suspended on the peripheral wall with substantially no clearance between each of the two or more nets and the peripheral wall and held sufficiently loosely to permit relative movement of each of the two or more nets such that an effective pore size of the two or more nets is variable over time to encourage fluidic condensation at the two or more nets and to permit a relatively substantial portion of the gaseous and particulate matter to continue to flow.

According to another aspect of the invention, an apparatus is provided and includes an inlet, including a peripheral wall formed to define a pathway along which gaseous, fluidic and particulate matter flow, two or more nets sequentially disposed in the pathway, a suspension coupled to the peripheral wall and the two or more nets to suspend the two or more nets on the peripheral wall with substantially no clearance between each of the two or more nets and the peripheral wall and with the two or more nets held sufficiently loosely to permit relative movement of each of the two or more nets such that an effective pore size of the two or more nets is variable over time to encourage fluidic condensation at the two or more nets and to permit a relatively substantial portion of the gaseous and particulate matter to continue to flow and a drainage system into which the condensed fluid drains off of the two or more nets.

According to yet another aspect of the invention, an apparatus is provided and includes an inlet, including a peripheral wall formed to define a pathway along which gaseous, fluidic and particulate matter flow, a first net disposed in the pathway, a second net disposed in the pathway downstream from the first net, a suspension coupled to the peripheral wall and the first and second nets to suspend the first and second nets on the peripheral wall with substantially no clearance between each of the first and second nets and the peripheral wall and with the first and second nets held sufficiently loosely to permit relative movement of each of the first and second nets such that an effective pore size of the first and second nets is variable over time to encourage fluidic condensation and to permit a relatively substantial portion of the gaseous and particulate matter to continue to flow and a drainage system into which the condensed fluid drains off of the first and second nets.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification.

The foregoing and other features, and advantages of the invention are apparent from the following detailed description taken in conjunction with the accompanying drawings in which.

The detailed description explains embodiments of the invention, together with advantages and features, by way of example with reference to the drawings.

DETAILED DESCRIPTION OF THE INVENTION

Figure 1:
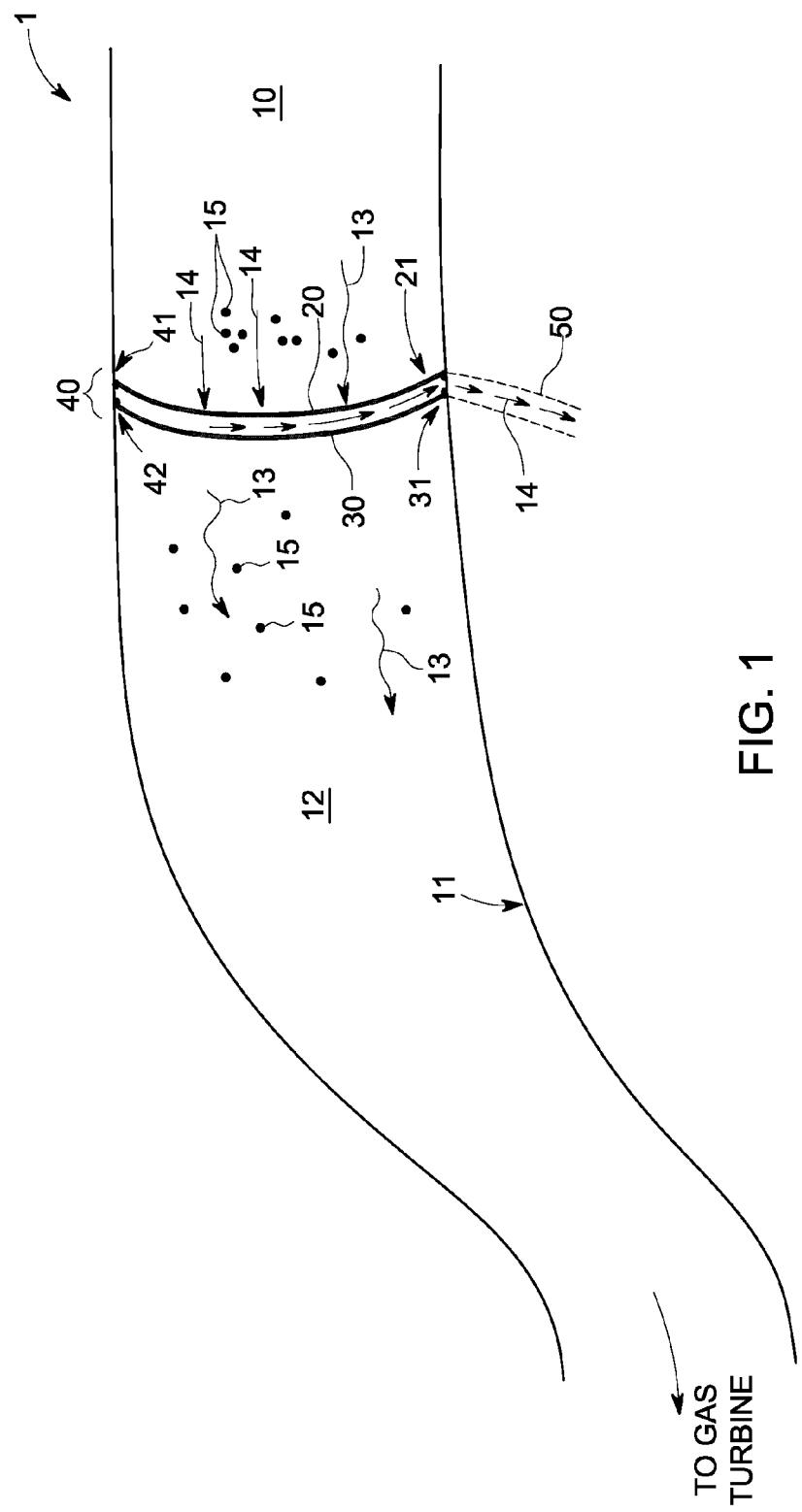
FIG. 1 is a side view of an exemplary gas turbine inlet.
Figure 2:
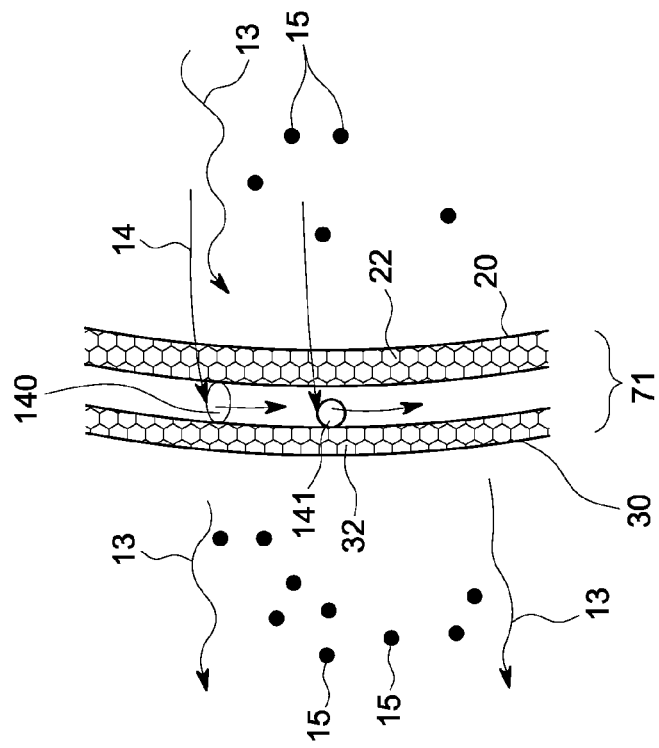
FIG. 2 is an enlarged view of first and second nets of the gas turbine inlet.
Figure 3:
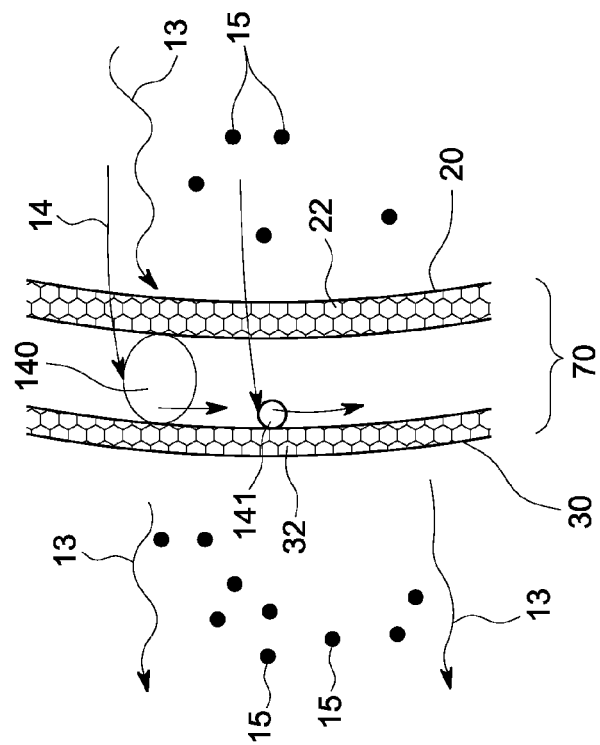
FIG. 3 is an enlarged view of the first and second nets of the gas turbine inlet of FIG. 1 at a different time from a time shown in FIG. 2.

With reference to FIGS. 1-3, an apparatus 1 is provided as an upstream protection device for, e.g., a filtration part of a gas turbine inlet of a gas turbine engine or a machine/inlet requiring filtration. The apparatus 1 serves to coalesce relatively fine mist, fog particles and droplets into larger droplets that are then gravitationally removed from the airstream by drainage action. The apparatus 1 permits dust to pass through, however, and thus does not become clogged. Where dust is captured, it is washed away as the large droplets drain.

The apparatus 1 includes an inlet 10. The inlet 10 includes a peripheral wall 11 that may be formed with various shapes and sizes and may have for example ovoid or rectangular cross-sections. The peripheral wall 11 is formed to define a pathway 12 along which gaseous matter 13, fluidic matter 14 and particulate matter 15 flow within the airstream toward the gas turbine or, in other embodiments, a machine or an inlet to another unit.

The apparatus 1 further includes two or more nets, such as first net 20 and second net 30, which are sequentially disposed in the pathway 12 such that the second net 30 is disposed downstream from the first net 20 and such that the airstream impinges upon the first net 20 and then the second net 30. The apparatus 1 further includes a suspension 40 and, in some embodiments, a drainage system 50. The suspension 40 is coupled to the peripheral wall 11 and the first and second nets 20 and 30 to suspend the first and second nets 20 and 30 on the peripheral wall 11. The drainage system 50 provides a system into which condensed fluid drains off of the first and second nets 20 and 30.

The suspension 40 suspends the first and second nets 20 and 30 on the peripheral wall 11 with substantially little or no clearance between each of the first and second nets 20 and 30 and the peripheral wall 11. This way, the airstream is forced through the first and the second nets 20 and 30 and is prevented from seeking a path of least resistance around the first and second nets 20 and 30. The suspension 40 may be coupled substantially to an entire periphery 21 and 31 of each of the first and second nets 20 and 30, respectively, and to the peripheral wall 11. In addition or alternatively, the pathway 12 may be defined substantially entirely through the first and second nets 20 and 30. The suspension 40 may include a single part for each of the first and second nets 20 and 30 or separate sub-suspensions 41 and 42 for each of the first and second nets 20 and 30, respectively.

The first net 20 and the second net 30 are held sufficiently loosely to permit relative movement the first net 20 with respect to the second net 30 and vice versa in response to airstream impingement thereon. The first and second nets 20 and 30 may each have a substantially similar tension or a unique tension. In either case, a degree of the relative movement is ever-changing and, as a result of the ever-changing relative movement of the first and second nets 20 and 30, an effective pore size 70 and 71 (see FIGS. 2 and 3, respectively) of the first and second nets 20 and 30 is variable over time. The variability of the effective pore sizes 70, 71 encourages fluidic condensation at one or both of the first and second nets 20 and 30. Conversely, the effective pore sizes 70, 71 are each maintained large enough to permit a relatively substantial portion of the gaseous and particulate matter to continue to flow toward the turbine or at least through the first and second nets 20 and 30.

As shown in FIGS. 2 and 3, the gaseous matter 13, fluidic matter 14 and particulate matter 15 impinge upon the first and second nets 20 and 30, which each have a characteristic pore size 22 and 32, respectively, of about 1 mm. A typical net 20 or 30 may be formed of a Raschel Weave having a lacelike, open construction of a relatively heavy, textured yarn held in place by a much finer yarn, a shade net type with shading values from about 35% to about 80%, for example, or similar net types. The impingement upon the first and second nets causes a relative movement of about 5 cm or more and could be as much as half the perpendicular height (or length or width) of the first and second nets 20 and 30 and may lead to a billowing, wave-like or turbulent effect on the first and second nets 20 and 30.

The condensation of the fluidic matter 14 may occur at either or both of the first and second nets 20 and 30. For example, as shown in FIGS. 2 and 3, the droplet 140 contacts each net. Conversely, the droplet 141 contacts only the second net 30 although it is understood that it could also contact only the first net 20.

The first and second nets 20 and 30 may be disposed vertically with respect to a direction of gravity or at least substantially perpendicularly with respect to a predominant direction of flow along the pathway 12. In some embodiments, the first and second nets 20 and 30 may be disposed at an angle with respect to the flow along the pathway 12 but sufficiently vertically whereby gravitational drainage of condensed fluid is encouraged and/or facilitated. Further, the first and second nets 20 and 30 may be disposed in parallel with one another or traversely with respect to one another.

In accordance with other aspects, a method of assembling an inlet 10 of a gas turbine engine is provided and includes suspending two or more nets, such as the first net 20 and the second net 30, sequentially in a pathway 12 defined by a peripheral wall 11 of the inlet 10 along which gaseous matter 13, fluidic matter 14 and particulate matter 15 flow as described above. Here, the suspending provides substantially little or no clearance between each net 20, 30 and the peripheral wall 11. Also, the suspending includes leaving the first and second nets 20 and 30 held sufficiently loosely to permit relative movement of each such that an effective pore size 70, 71 of the first and second nets 20, 30 is variable over time to encourage fluidic condensation at the first and second nets 20, 30 and to permit a relatively substantial portion of the gaseous and particulate matter to continue to flow.

Figure 4:
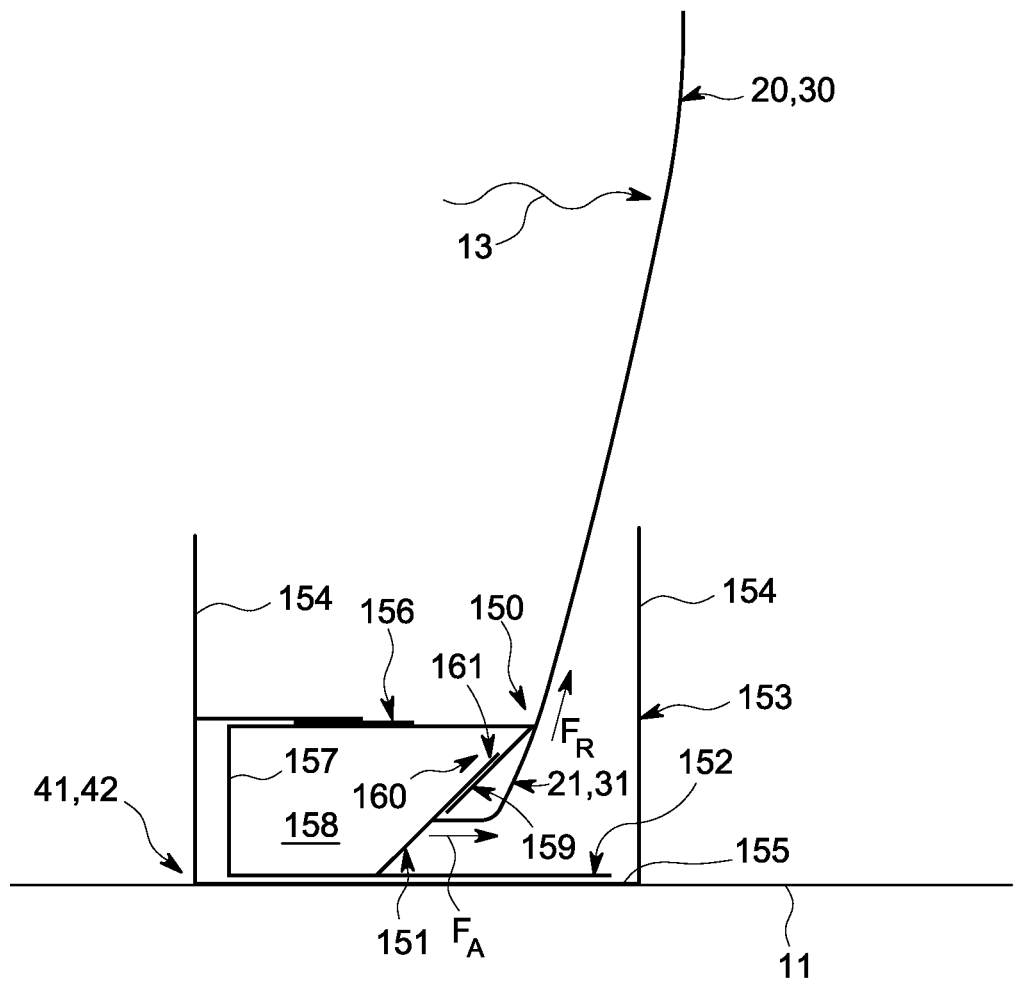
FIG. 4 is an enlarged view of a suspension assembly for the first and second nets.

With reference to FIG. 4, sub-suspensions 41, 42 may be formed as a retention system 150 that retains a pocket neck extrusion 151, to which the first or the second net 20 or 30 may be attached, in an inner frame 152, which is itself supported by an outer frame 153. In accordance with embodiments, the entire periphery 21 or 31 of each of the first or the second net 20 or 30 may be sewn or otherwise connected to the pocket neck extrusion 151, which is a substantially rigid member having a shape that generally corresponds to a shape of the periphery 21 or 31 of the first or the second net 20 or 30. The inner frame 152 may also be a substantially rigid member having a shape that generally corresponds to a shape of the periphery 21 or 31 of the first or the second net 20 or 30 so that retention of a substantial entirety of the pocket neck extrusion 151 is possible.

As shown in FIG. 4, the outer frame 153 includes sidewalls 154 extending from opposing ends of a base 155 and a notch 156 positioned along a mid-section of one of the sidewalls 154. The outer frame 153 may be installed within the pathway 12 by attachment of the base 155 to the peripheral wall 11 with little or no clearance. The outer frame 153 may be formed of any suitable material, such as, for example, a metal or a metallic alloy and may be formed to surround the first or the second net 20 or 30 or as multiple assemblies arranged at various positions around the peripheral wall 11 as long as there is little or no clearance between the inner frame 152 and the peripheral wall 11.

The inner frame 152 includes a frame structure 157 having, for example, a u-shaped cross section that defines an interior 158 and a member 159 coupled to a portion of the frame structure 157 at an angle to form a pocket 160. The interior 158 may be receptive of the pocket neck extrusion 151, which, once received therein, may be oriented with a cross-sectional end 161 disposed in the pocket 160. The inner frame 152 may then be inserted into the outer frame 153 between the sidewalls 154 and between the base 155 and the notch 156 so that the portion of the frame structure 157 to which the member 159 is coupled to form the pocket 160 abuts the notch 156. With this arrangement, no combination of axial forces, $F_A$, or radial forces, $F_R$, can be applied to the retention system 150 as shown in FIG. 4 by the first or the second net 20 or 30 in order to remove the pocket neck extrusion from the pocket 160 or the inner frame 152 from the outer frame 153.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus, comprising:
    an inlet, including a peripheral wall formed to define a pathway along which gaseous, fluidic and particulate matter flow; and
    two or more nets sequentially disposed in the pathway, the two or more nets being suspended on the peripheral wall with substantially no clearance between each of the two or more nets and the peripheral wall and held sufficiently loosely to permit relative movement of each of the two or more nets such that an effective pore size of the two or more nets is variable over time to encourage fluidic condensation at the two or more nets and to permit a relatively substantial portion of the gaseous and particulate matter to continue to flow.

2. The apparatus according to claim 1, wherein the apparatus comprises a gas turbine.

3. The apparatus according to claim 1, wherein the two or more nets each have pore sizes of less than about 1 mm.

4. The apparatus according to claim 1, wherein the two or more nets comprise a Raschel Weave.

5. The apparatus according to claim 1, wherein the two or more nets comprise a shade netting with shade performance of about 35% to about 80%.

6. The apparatus according to claim 1, wherein the relative movement is more than about 5 cm.

7. The apparatus according to claim 1, wherein the relative movement is up to half a perpendicular length of either of the two or more nets.

8. The apparatus according to claim 1, wherein a substantially entire periphery of each of the two or more nets is connected to the peripheral wall.

9. The apparatus according to claim 1, wherein the two or more nets each have a substantially similar tension.

10. The apparatus according to claim 1, wherein the two or more nets each have a unique tension.

11. The apparatus according to claim 1, wherein the fluidic condensation occurs at least at one of the two or more nets.

12. The apparatus according to claim 1, wherein the two or more nets are oriented substantially perpendicularly with respect to a predominant direction of gaseous, fluidic and particulate matter flow along the pathway.

13. The apparatus according to claim 1, wherein the two or more nets are disposed sufficiently vertically whereby gravitational drainage of condensed fluid is encouraged.

14. The apparatus according to claim 1, wherein the two or more nets are disposed in parallel with one another.

15. The apparatus according to claim 1, wherein the two or more nets are disposed transversely with respect to one another.

16. An apparatus, comprising:
an inlet, including a peripheral wall formed to define a pathway along which gaseous, fluidic and particulate matter flow;
two or more nets sequentially disposed in the pathway;
a suspension coupled to the peripheral wall and the two or more nets to suspend the two or more nets on the peripheral wall with substantially no clearance between each of the two or more nets and the peripheral wall and with the two or more nets held sufficiently loosely to permit relative movement of each of the two or more nets such that an effective pore size of the two or more nets is variable over time to encourage fluidic condensation at the two or more nets and to permit a relatively substantial portion of the gaseous and particulate matter to continue to flow; and
a drainage system into which the condensed fluid drains off of the two or more nets.

17. The apparatus according to claim 16, wherein the suspension is coupled to a substantial entirety of a periphery of each of the two or more nets.

18. The apparatus according to claim 16, wherein the suspension comprises a single suspension for the two or more nets.

19. The apparatus according to claim 16, wherein the suspension comprises a separate sub-suspension for each of the two or more nets.

20. The apparatus according to claim 19, wherein each sub-suspension comprises:
a pocket neck extrusion, to which an entire periphery of one of the two or more nets is attached;
an inner frame to define a pocket to retain the pocket neck extrusion; and
an outer frame, attached to the peripheral wall, in which the inner frame is supported.

21. The apparatus according to claim 20, wherein the entire periphery is sewn to the pocket neck extrusion.

22. The apparatus according to claim 20, wherein the inner frame comprises:
a frame structure defining an interior; and
a member coupled to the frame structure to define the pocket.

23. The apparatus according to claim 22, wherein the pocket neck extrusion is received within the interior and, once received, oriented for disposition in the pocket.

24. The apparatus according to claim 20, wherein the outer frame comprises:
a base attachable to the peripheral wall;
sidewalls extending from opposing ends of the base; and
a notch positioned along a mid-section of one of the sidewalls.

25. The apparatus according to claim 24, wherein the inner frame is insertible into the outer frame between the sidewalls and between the base and the notch.

26. The apparatus according to claim 20, wherein no combination of axial or radial forces applied by the one of the two or more nets removes the pocket neck extrusion from the pocket or the inner frame from the outer frame.

27. An apparatus, comprising:
an inlet, including a peripheral wall formed to define a pathway along which gaseous, fluidic and particulate matter flow;
a first net disposed in the pathway;
a second net disposed in the pathway downstream from the first net;
a suspension coupled to the peripheral wall and the first and second nets to suspend the first and second nets on the peripheral wall with substantially no clearance between each of the first and second nets and the peripheral wall and with the first and second nets held sufficiently loosely to permit relative movement of each of the first and second nets such that an effective pore size of the first and second nets is variable over time to encourage fluidic condensation and to permit a relatively substantial portion of the gaseous and particulate matter to continue to flow; and
a drainage system into which the condensed fluid drains off of the first and second nets.

* * * * *